United States Patent
Boe et al.

(10) Patent No.: US 10,549,579 B1
(45) Date of Patent: Feb. 4, 2020

(54) ADJUSTABLE VEHICLE AXLE

(71) Applicant: ONE3 Design, Inc., Cedar Falls, IA (US)

(72) Inventors: Thomas C. Boe, Cedar Falls, IA (US); Kyle L. Boe, Cedar Falls, IA (US); Thomas E. Boe, Cedar Falls, IA (US); Mark J. Deutsch, Newton, IA (US); Forrest R. Beeler, Cedar Falls, IA (US); Matthew T. Miller, Dike, IA (US)

(73) Assignee: ONE3 Design, Inc., Cedar Falls, IA (US)

( * ) Notice: Subject to any disclaimer, the term of this patent is extended or adjusted under 35 U.S.C. 154(b) by 0 days.

(21) Appl. No.: 16/210,104

(22) Filed: Dec. 5, 2018

(51) Int. Cl.
*B60B 35/10* (2006.01)

(52) U.S. Cl.
CPC ........ *B60B 35/109* (2013.01); *B60B 35/1009* (2013.01); *B60B 2900/114* (2013.01); *B60Y 2200/221* (2013.01)

(58) Field of Classification Search
CPC ..................................................... B62D 21/14
See application file for complete search history.

(56) References Cited

U.S. PATENT DOCUMENTS

| | | | |
|---|---|---|---|
| 4,040,643 A | 8/1977 | Applequist et al. | |
| 4,350,222 A | 9/1982 | Lutteke et al. | |
| 4,619,340 A | 10/1986 | Elmer et al. | |
| 4,828,071 A | 5/1989 | Gaede | |
| 5,039,129 A | 8/1991 | Balmer | |
| 5,083,630 A | 1/1992 | Zaun | |
| 5,282,644 A | 2/1994 | Larson | |
| 5,454,583 A | 10/1995 | Torborg | |
| 5,489,113 A | 2/1996 | Torborg | |
| 5,597,172 A | 1/1997 | Maiwald et al. | |
| 6,139,045 A | 10/2000 | Vandenbark et al. | |
| 6,584,390 B2 | 6/2003 | Beck | |
| 6,829,124 B2 | 12/2004 | Leopold et al. | |
| 7,163,227 B1 * | 1/2007 | Burns | B60B 35/1054 180/906 |
| 8,180,533 B2 | 5/2012 | Coers et al. | |
| RE45,405 E | 3/2015 | Humpal et al. | |
| 2018/0050746 A1 * | 2/2018 | Lubben | B62D 55/084 |

* cited by examiner

*Primary Examiner* — John D Walters
*Assistant Examiner* — James J Triggs
(74) *Attorney, Agent, or Firm* — Shuttleworth & Ingersoll, PLC; Jason Sytsma

(57) ABSTRACT

A pair of wheels coupled together by an adjustable axle mechanism. A right straight-line linkage coupled to a right wheel and a left straight-line linkage coupled to a left wheel. The right straight-line linkage and the left straight-line linkage are connected together and each move independently from each other between an extended position and a retracted position.

18 Claims, 5 Drawing Sheets

ADJUSTABLE VEHICLE AXLE

TECHNICAL FIELD

This invention relates to self-propelled vehicles such as agricultural tractors, as well as any load carrying vehicles, such as grain carts and the and axles therefore, and more particularly to adjustable axles for such vehicles to provide desired spacing of the vehicle wheels.

BACKGROUND OF THE INVENTION

Adjustable axles have been used for vehicles, particularly axles for agricultural vehicles such as tractors, implements, and the like. Adjustable axles have provided such vehicles with improved versatility to accommodate row spacing and other requirements. Occasionally, these vehicles are driven over public highways, for example, when tractors and implements are transported between farmsteads and fields or when produce is transported from the field directly to a nearby market or storage facility. Many states, however, have statutes which provide that vehicles having an axle width of greater than a specified amount (typically 8 feet) are not avowed to use the highway without special permit. Hence, the agricultural vehicle axle must be capable of complying with such standards. On the other hand, when such vehicles are used during field operation, it is often desirable to have the axle width extended to provide additional stability. This is particularly true when the loads are heavy and the fields or roads are on hill sides. Also, when operation is in growing crops it is desirable to have a vehicle whose axle can be adjusted to allow travel between the rows of the planted field. This is especially important when the crops are tall such as standing corn or grapes in a vineyard.

Farm vehicles having wheels that can be moved to adjust the spacing between the wheels are known in the art. It is desirable to adjust the spacing between wheels of the farm vehicle to match the row spacing of a crop in which the vehicle is being used to minimize damage to the crop.

Some crops, such as those found in vineyards, have extremely narrow rows along banked hillsides. Tractors used for orchard and vineyard cultivating require adjustable wheel spacing to allow fit between rows. Unlike sprayers and other equipment used for row crop farming, it is inconvenient for equipment used for tillage in orchards and vineyards to straddle the rows. Typically, tractors used in vineyards and orchards are small and narrow. When these tractors are driven at higher speed to travel between fields, it is desired that the wheel spacing be increased to provide more stability. A means to quickly adjust wheel spacing would aid the operator in changing between narrow, in field, spacing to wider transport spacing.

A number of means to achieve this quick adjustment of spacing are known in the prior art. However, these applications have been applied to large vehicles which straddle the crops. Because of the height of the crops a narrow tractor to fit between the rows is most desirable. This requires a vehicle with adjustable tire tread widths between 1.15 and 2.15 meters. The conventional use of sliding beams or tubes is not practical due to the length of the support members required.

What is needed is an adjustable axle that allows for a much narrower minimum spacing than the conventional sliding tube techniques allow.

SUMMARY

Disclosed is a vehicle that comprises of a pair of wheels coupled together by an adjustable axle mechanism. The adjustable axle mechanism comprises of a right straight-line linkage coupled to a right wheel and a left straight-line linkage coupled to a left wheel. The right straight-line linkage and the left straight-line linkage are connected together and each move independently from each other between an extended position and a retracted position.

More specifically, each of the right straight-line linkage and the left straight-line linkage further comprises a first scissor unit and a second scissor unit. With reference to the right straight-line linkage, it further comprises of a pair of first bars each of which is coupled to the right tire assembly at one end and the other end pivotally connected to one of a pair of second bars each of which is connected to the frame mounting member at its other end. Movement of each of the first bars and the second bars can be joined together by a first timing linkage and a second timing linkage, respectively, to maintain the right fire assembly parallel to the frame mounting member.

The first timing linkage can comprise of an arcuate member with a connection point at a center of an arc and a connection point at each outer end of the arc. In this implementation, the arcuate member is combined to the right tire assembly at the connection point at the center of the arc and combined to one of the first bars at one outer end of the arc and to the other first bar at the other outer end of the arc for maintaining an angel between each of the pair of first bars equal and opposite to each other with respect to a horizontal pivot axis. The second timing linkage can comprise of an elongated member with a connection point at a center of the elongated member and a connection point at each outer end of the elongated member. The elongated member is combined to the frame mounting member at the connection point at the center of the elongated member and to each one of the second bars at respective outer ends of the elongated member for maintaining an angel between each of the pair of second bars equal and opposite to each other with respect to the horizontal pivot axis.

Importantly, the right straight-line linkage and the left straight-line linkage are positioned entirely between the outer wheel wall of the right wheel and the left wheel. Furthermore, each of the right wheel and the left wheel have a rotational axis and the right straight-line linkage and the left straight-line linkage are each centered about the corresponding rotational axis.

DETAILED DESCRIPTION

Figure 1:
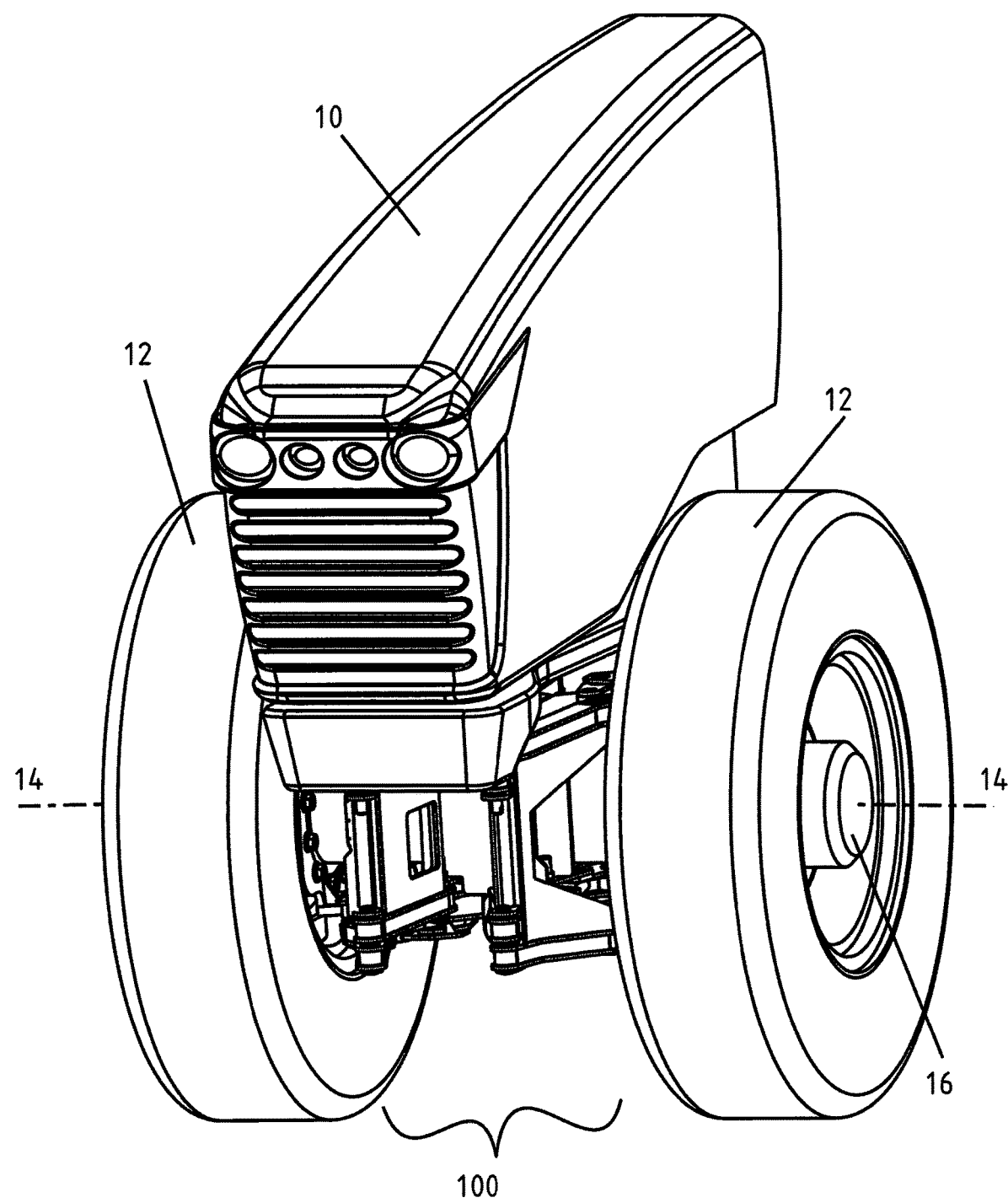
FIG. 1 is a perspective view of a farm vehicle showing a pair of spaced apart wheels to which an adjustable axle mechanism in accordance with this disclosure is coupled.
Figure 2:
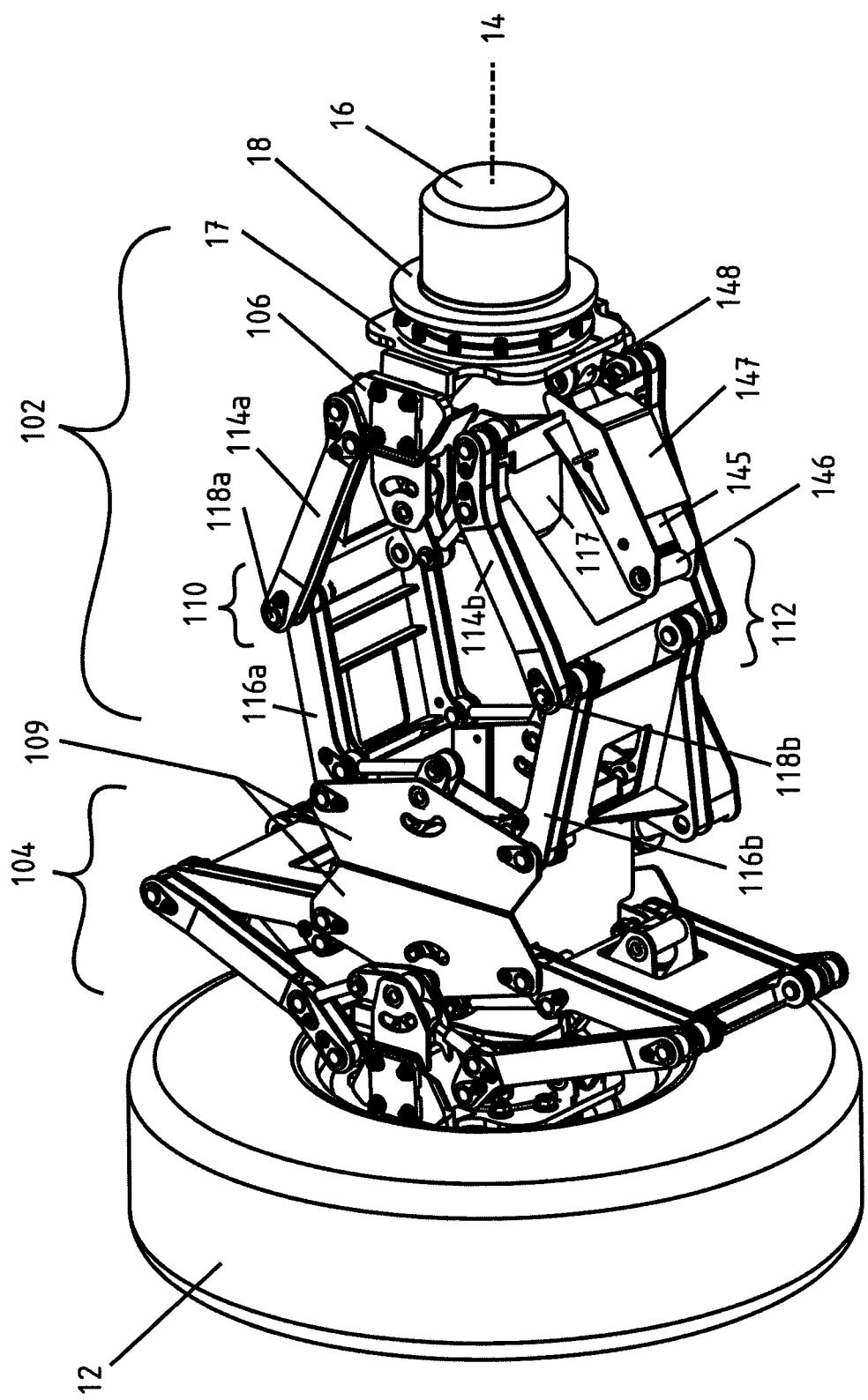
FIG. 2 is a perspective view of the adjustable axle mechanism in accordance with this disclosure that is coupled to one of a pair of wheels with one side fully extended and the other side fully retracted.
Figure 3:
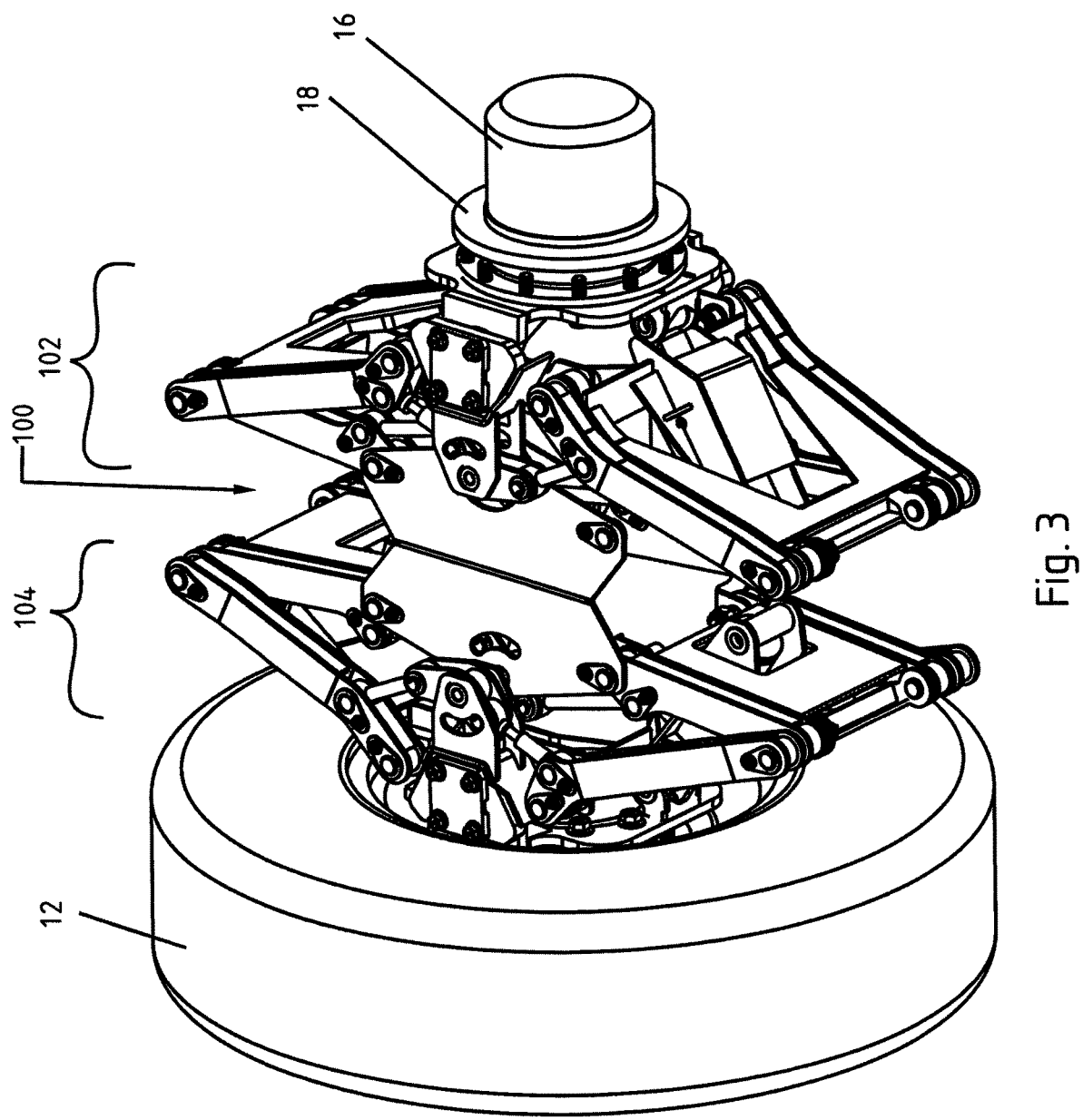
FIG. 3 is the adjustable axle mechanism of FIG. 2 with both sides in the fully retracted position, as also shown in FIG. 1.

FIG. 1 shows the front end of a vehicle 10, such as a tractor used for farming in vineyards. Vehicle 10 includes two pairs of spaced-apart wheels 12 with each wheel 12 in the pair of wheels separated by an adjustable axle mechanism 100 in accordance with the present invention. FIG. 2 shows a perspective view of adjustable axle mechanism 100 coupled to one of a pair of wheels 12 with one side of adjustable axle mechanism 100 fully extended and the other side fully retracted. FIG. 3 shows both sides of adjustable axle mechanism 100 in the fully retracted position. By comparing these figures, one can see that each wheel on adjustable axle mechanism 100 can be moved independently of the other.

Referring to FIG. 2, each wheel 12 is connected to a wheel hub 16 that is connected to an outer knuckle assembly 17 and is driven by a motor 117 for rotation about the substantially horizontal pivot axis 14. Each wheel hub 16 includes an annular flange 18 to which respective wheels 12 are fastened so that the wheels 12 each also rotate about horizontal pivot axis 14.

Adjustable axle mechanism 100, generally, comprises of a right straight-line linkage 102 coupled to a right hub 16 (the wheel is removed for illustrative purposes) and a left straight-line linkage 104 coupled to a left wheel 12. While each of right straight-line linkage 102 and left straight-line linkage 104 is connected together, each move independently from each other between an extended position and a retracted position. Each of right straight-line linkage 102 and left straight-line linkage 104 comprises of a tire mounting assembly 106 and a frame mounting member 109 that are constrained for movement substantially parallel to each other by the linkages therebetween.

The linkages of right straight-line linkage 102 and left straight-line linkage 104 can be implemented as a six-bar linkage. In such an instance, each can comprise a first scissor unit 110 and a second scissor unit 112 extending between the tire mounting assembly 106 and the frame mounting member 109. Frame mounting member 109 can have a left middle axe assembly 108*b* and a right middle axle assembly 108*a*, which combines the frame of vehicle 10 to adjustable axle mechanism 100, and, in this regard, functions as the fixed reference frame.

Each of first scissor unit 110 and second scissor unit 112 comprises of a first bar 114*a*, 114*b* coupled to the mounting member 106 at one end and to a second bar 116*a*, 116*b* at the other end. The other end of each second bar 116*a*, 116*b* is coupled to frame mounting member 109 at its other end. The second end of the first bar 114*a*, 114*b* and the second end of the second bar 116*a*, 116*b* are pivotally coupled together at a hinge 118*a*, 118*b*.

Figure 5:
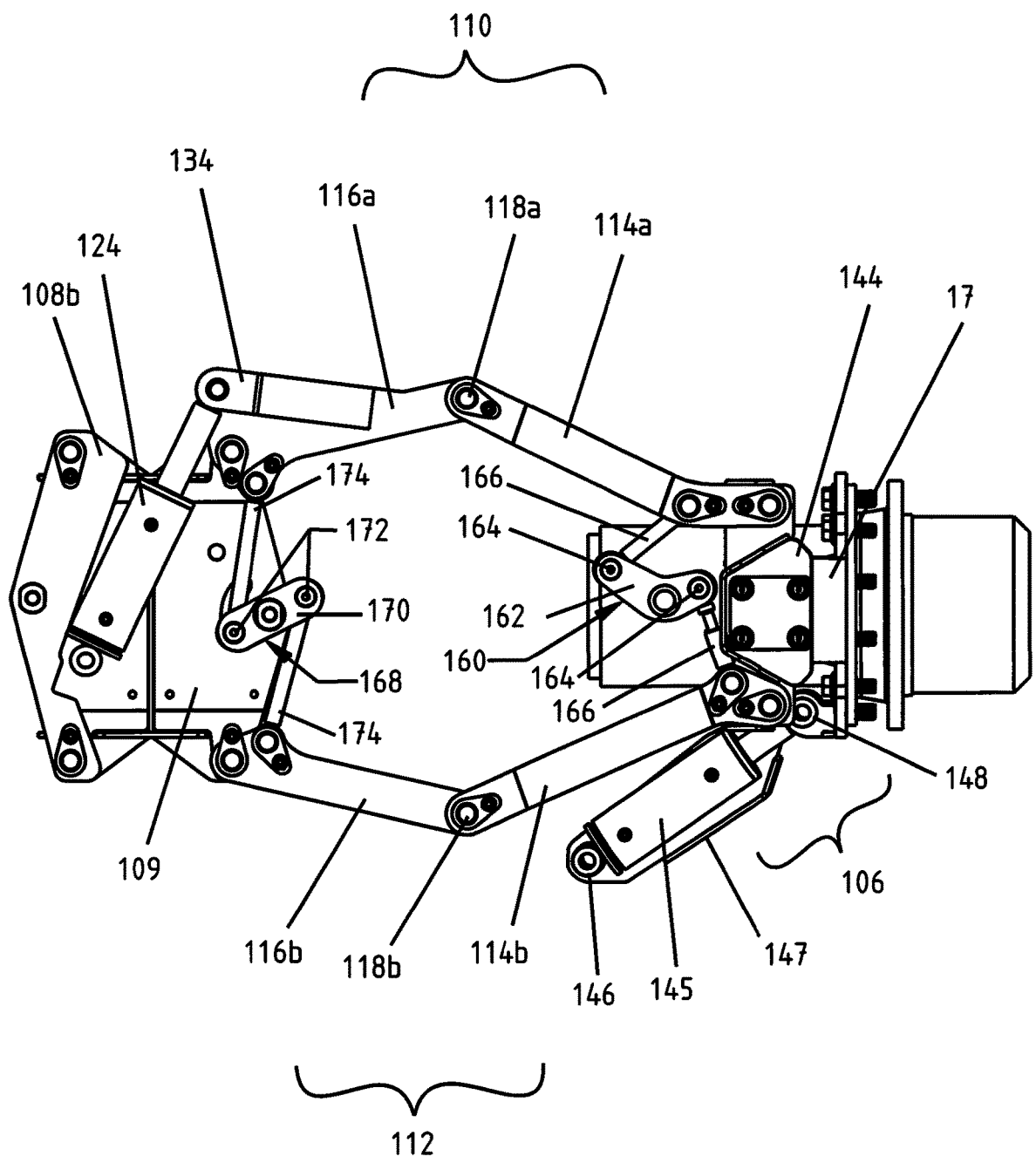
FIG. 5 is the plan view of the adjustable axle mechanism of FIG. 4 showing one side only with some parts removed to allow a view of some of the otherwise hidden parts.

Second bar 116*a*, 116*b* of each of first scissor unit 110 and second scissor unit 112, respectively, is connected to frame mounting member 109. Second bar 116*a* or 116*b* can be implemented as an inner-driven link. Referring to FIG. 5, second bar 116*a* is configured as an inner-driven link with an arcuate portion 134. Actuating cylinder 124 is connected between frame mounting member 109 on one end and to arcuate portion 134 of second bar 116*a* at the other end. The other end of second bar 116*a* can be pivotally coupled at hinge 118*a* to first bar 114*a* of first scissor unit 110, which can be implemented as an outer-driven link.

Figure 4:
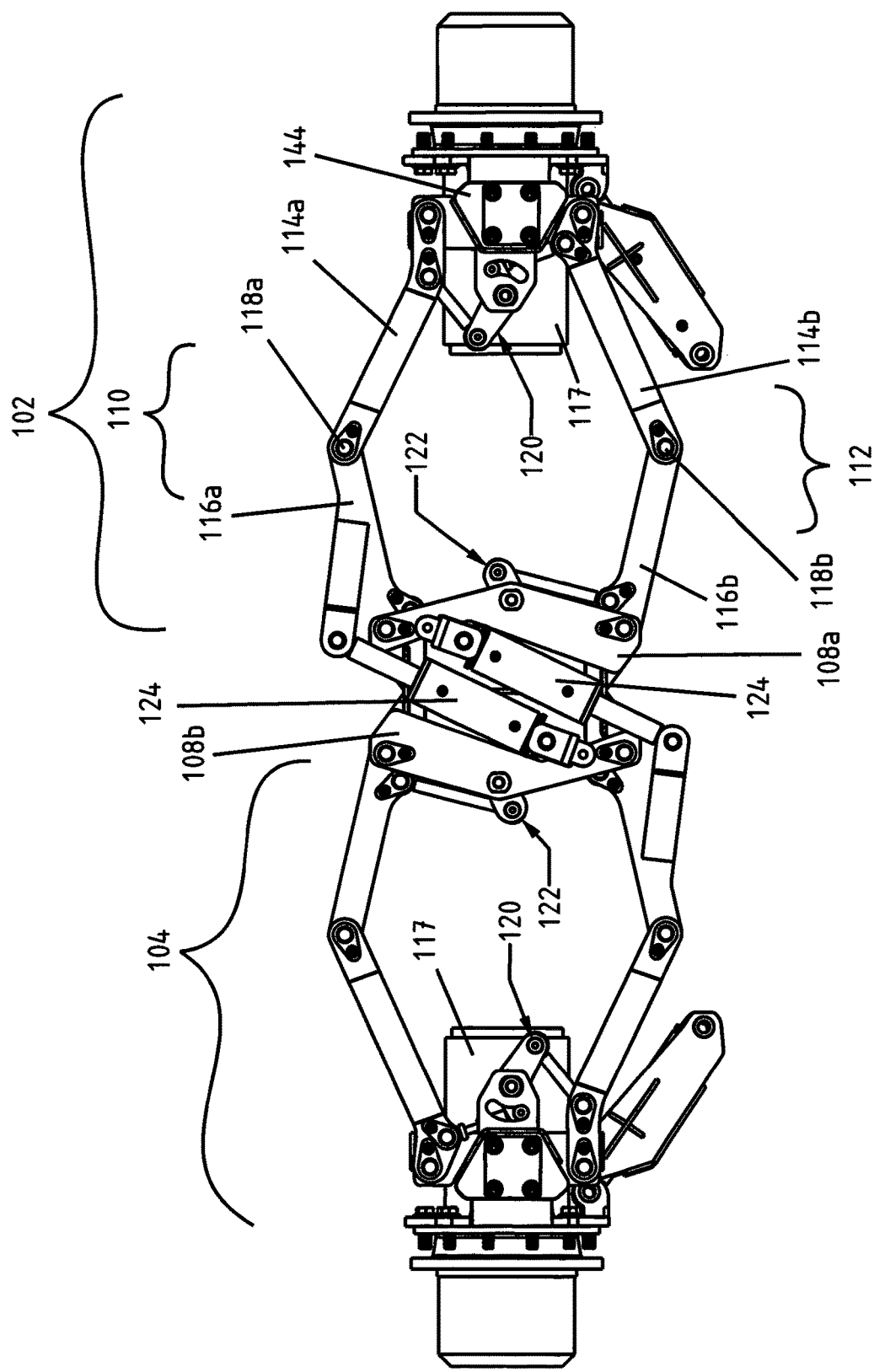
FIG. 4 is a plan view of the adjustable axle mechanism of PG. 2 with both sides in an extended position and both wheels removed.

Referring to FIG. 4, two actuating cylinders 124 that can each be used to move each right straight-line linkage 102 and left straight-line linkage 104 between the retracted position and the extended position. Actuating cylinders 124 can be coupled between frame mounting member 109 and one of first scissor unit 110 or second scissor unit 112 for moving the respective right straight-line linkage 102 or left straight-line linkage 104 between the extended position and the retracted position. The linear extension and retraction of the rod in actuating cylinder 124 rotates second bar 116*a* of the first scissor unit 110. The angular rotation of second bar 116*a* forces an inner-end of first bar 114*a* inward, which forces inner-knuckle assembly 144 (and thus wheel 12) outward.

A first timing linkage 120 and a second timing linkage 122 couple the first scissor unit 110 and the second scissor unit 112 together. First timing linkage 120 is coupled between the first bar 114*a* of the first scissor unit 110 and the first bar 114*b* of the second scissor unit 112 to maintain the angle between tire mounting assembly 106 and the first bar 114*a* of the first scissor unit 110 equal and opposite to the angle between tire mounting assembly 106 and the first bar 114*b* of the second scissor unit 112. Second timing linkage 122 is coupled between the second bar 116*a* of first scissor unit 110 and the second bar 116*b* of second scissor unit 112 for coupling first scissor unit 110 and second scissor unit 112 together to maintain the angle between the frame mounting member 109 and the second bar 116*a* of the first scissor unit 110 equal and opposite to the angle between the frame mounting member 109 and the second bar 116*b* of the second scissor unit 112. By thus maintaining these two sets of angle equal and opposite, the tire mounting assembly 106 is maintained parallel to the frame mounting member 109.

First scissor unit 110 has been described in detail as the drive linkages since it is powered by actuating cylinder 124. Second scissor unit 112 is therefore the slave linkage. Second bar 116*b* can be implemented as an inner-slave link. Referring to FIG. 5, the other end of second bar 116*b* can be pivotally coupled at hinge 118*b* to first bar 114*b* of second scissor unit 112, which can be implemented as an outer-slave link.

As previously stated, one end of first bar 114*b* is pivotally coupled at hinge 118*b* to second bar 116*b*. The other end of first bar 114*b* is connected to inner-knuckle assembly 144 of tire mounting assembly 106.

Tire mounting assembly 106 can comprise of inner-knuckle assembly 144 and an outer knuckle assembly 17. The inner-knuckle assembly 144 is coupled to outer knuckle assembly 17 which is connected to wheel 12 through wheel hub 16. In the case of a steered axle, the steering cylinder 145 is attached to the inner-knuckle assembly 144 at attachment pin 146 of the steering cylinder mounting member 147 and is attached to the outer knuckle assembly 17 at attachment pin 148. This allows the steering cylinder 145 to rotate the outer knuckle assembly 17 relative to the inner-knuckle assembly 144 to provide steering. The steering angle remains constant during the extension and retraction of tire mounting assembly 106 because of the location of steering cylinder 145 between inner-knuckle assembly 144 and outer knuckle assembly 17 and the parallel movement of tire mounting assembly 106 with respect to frame mounting member 109.

When a non-steering axle is implemented, the inner-knuckle assembly 144 is rigidly attached to the outer knuckle assembly 17 and the steering cylinder 145 is not installed.

As previously described, first timing linkage 120 is coupled between the first bar 114*a* of the first scissor unit 110 and the first bar 114*b* of the second scissor unit 112 to maintain the angle between tire mounting assembly 106 and the first bar 114*a* of the first scissor unit 110 equal and opposite to the angle between the tire mounting assembly 106 and the first bar 114*b* of the second scissor unit 112. Second timing linkage 122 is coupled between the second bar 116*a* of the first scissor unit 110 and the second bar 116*b* of the second scissor unit 112 for coupling first scissor unit 110 and second scissor unit 112 together to maintain the angle between the frame mounting member 109 and the second bar 116a of the first scissor unit 110 equal and opposite to the angle between the frame mounting member 109 and the second bar 116b of the second scissor unit 112. By thus maintaining these two set of angles equal and opposite, the tire mounting assembly 106 is maintained parallel to the frame mounting member 109. First timing linkage 120 can be implemented as an outer bell-crank 160 that provides synchronization between first bar 114a of the first scissor unit 110 and first bar 114b of the second scissor unit 112 to ensure angles between first bar 114a of the first scissor unit 110 and first bar 114b of the second scissor unit 112 and the inner-knuckle assembly 144 each remain equal and opposite during movement.

The outer bell-crank 160 comprises an arcuate member 162 with a connection point 164 at the outer and middle ends of arcuate member 162. At the middle end of arcuate member 162, is coupled a non-adjustable link 166. At the outer end of arcuate member 162, is coupled an adjustable link 167 that provides for manual adjustment of the range of motion to ensure that the motion is parallel. This adjustable link 167 further provides adjustment between the first scissor unit 110 and the second scissor unit 112 to ensure parallel operation between the inner-knuckle assembly 144 and the frame mounting member 109.

As previously described, second timing linkage 122 is coupled between the second bar 116a of first scissor unit 110 and the second bar 116b of second scissor unit 112 for coupling first scissor unit 110 and second scissor unit 112 together. Second timing linkage 122 can be implemented as a an inner bell-crank 168 that synchronously drives second bar 116a of first scissor unit 110, which in-turn drives first bar 114a of first scissor unit 110 in a manner similar to first bar 114b of second scissor unit 112.

The inner bell-crank 168 comprises of an elongated member 170 with outer and middle connection points 172. At each of the outer ends of elongated member 170 is coupled a non-adjustable link 174. Manual adjustment of the range of motion is done by the adjustable link 167 of outer bell-crank 160.

The foregoing adjustable axle mechanism 100 can be used to extend and retract each wheel 12 of a vehicle 10 independent of each other. The straight-line linkage that is coupled to each wheel 12 provides a compact arrangement for narrow track widths with an expansive wheel base. Adjustable axle mechanism 100 is centered about the horizontal pivot axis 14 of each wheel 12 and in line with motor 117, which means that This arrangement also places all of the structure for adjustable axle mechanism 100 between the wheels so that nothing sticks out past the wheel bases. In other words, each of the right wheel 12 and the left wheel 12 have a rotational axis 14 and the right straight-line linkage 102 and the left straight-line linkage 104 are each centered about rotational axis 14. Further, no part of the structure extends inward past the centerline of the vehicle when the track width is at the minimum position. In other words, each of right wheel 12 and left wheel 12 have an inner wheel wall that face toward each other and an outer wheel wall that face away from each other, the right straight-line linkage 102 and the left straight-line linkage 104 are positioned entirely between the outer wheel wall of the right wheel 12 and the left wheel 12.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A vehicle comprising a pair of wheels coupled together by an adjustable axle mechanism, the adjustable axle mechanism comprising:
    a right straight-line linkage coupled to a right wheel;
    a left straight-line linkage coupled to a left wheel; and
    wherein the right straight-line linkage and the left straight-line linkage are connected together and each move independently from each other between an extended position and a retracted position, wherein each of the right straight-line linkage and the left straight-line linkage comprises a tire mounting member and a frame mounting member, and wherein each of the right straight-line linkage and the left straight-line linkage further comprises a first scissor unit and a second scissor unit each of which comprises of a first bar comprising a first end coupled to the tire mounting member and a second end and a second bar comprising a first end coupled to the frame mounting member and a second end, wherein the second end of the first bar and the second end of the second bar are pivotally coupled together.

2. The adjustable axle mechanism of claim 1, wherein the tire mounting member and the frame mounting member move parallel with respect to each other.

3. The adjustable axle mechanism of claim 1, wherein each of the right straight-line linkage and the left straight-line linkage further comprises a first timing linkage coupled between the first bar of the first scissor unit and the first bar of the second scissor unit to maintain the tire mounting member parallel to the frame mounting member.

4. The adjustable axle mechanism of claim 3, wherein each of the right straight-line linkage and the left straight-line linkage further comprises a second timing linkage coupled between the second bar of the first scissor unit and the second bar of the second scissor unit for coupling the first scissor unit and the second scissor unit together.

5. The adjustable axle mechanism of claim 4, wherein each of the right straight-line linkage and the left straight-line linkage further comprises an actuating cylinder coupled between the frame mounting member and one of the first scissor unit and the second scissor unit for moving the respective right straight-line linkage and the left straight-line linkage between the extended position and the retracted position.

6. The adjustable axle mechanism of claim 1, wherein each of the right wheel and the left wheel have an inner wheel wall that face toward each other and an outer wheel wall that face away from each other, and wherein the right straight-line linkage and the left straight-line linkage are positioned entirely between the outer wheel wall of the right wheel and the left wheel.

7. The adjustable axle mechanism of claim 1, wherein each of the right wheel and the left wheel have a rotational axis and the right straight-line linkage and the left straight-line linkage are each centered about the rotational axis.

8. The adjustable axle mechanism of claim 3, wherein the first timing linkage further comprises of a pair of outer bell cranks wherein one of the pair of outer bell cranks is coupled between the tire mounting member and the first bar of the first scissor unit and the other of the pair of outer bell cranks is coupled between the tire mounting member and the first bar of the second scissor unit.

9. The adjustable axle mechanism of claim 8, wherein each of the pair of outer bell cranks further comprises of an arcuate member with an adjustable link coupled at each outer end thereof for manually adjusting a range of motion.

10. The adjustable axle mechanism of claim 4, wherein the second timing link further comprises of a pair of inner bell cranks wherein one of the pair of inner bell cranks is coupled between the frame mounting member and the second bar of the first scissor unit and the other of the pair of inner bell cranks is coupled between the frame mounting member and the second bar of the second scissor unit.

11. A vehicle comprising a pair of wheels coupled together by an adjustable axle mechanism, the adjustable axle mechanism comprising:
a frame mounting member;
a right tire assembly and a tire mounted to the right tire assembly;
a right straight-line linkage coupled between the frame mounting member and the right tire assembly, wherein the right straight-line linkage further comprises of a pair of first bars each of which is coupled to the right the assembly at one end and the other end pivotally connected to one of a pair of second bars each of which is connected to the frame mounting member at its other end;
a first timing linkage connected between the pair of first bars on the right straight-line linkage; and
a second timing linkage connected between the pair of second bars on the right straight-line linkage;
wherein the right straight-line linkage moves the tire between an extended position and a retracted position.

12. The adjustable axle mechanism of claim 11, wherein the first timing linkage further comprises of an arcuate member with a connection point at a center of an arc and a connection point at each outer end of the arc, wherein the arcuate member is combined to the right tire assembly at the connection point at the center of the arc, the arcuate member is combined to one of the first bars at one outer end of the arc, and the arcuate member is combined to the other first bar at the other outer end of the arc for maintaining an angel between each of the pair of first bars equal and opposite to each other with respect to a horizontal pivot axis.

13. The adjustable axle mechanism of claim 12, wherein the second timing linkage further comprises of an elongated member with a connection point at a center of the elongated member and a connection point at each outer end of the elongated member, wherein the elongated member is combined to the frame mounting member at the connection point at the center of the elongated member, the elongated member is combined to one of the second bars at one outer end of the elongated member, and the elongated member is combined to the other second bar at the other outer end of the elongated member for maintaining an angel between each of the pair of second bars equal and opposite to each other with respect to the horizontal pivot axis.

14. The adjustable axle mechanism of claim 13, wherein the horizontal pivot axis is in line with a motor that drives a right wheel connected to the right tire assembly.

15. A vehicle comprising:
a frame;
a frame mounting member mounted to the frame;
a right tire mounting assembly and a left tire mounting assembly
a wheel mounted to the right tire mounting assembly and a wheel mounted to the left tire mounting assembly;
a right straight-line linkage coupled to the right tire mounting assembly;
a left straight-line linkage coupled to the left tire mounting assembly; and
wherein the right straight-line linkage and the left straight-line linkage are connected together and each move independently from each other between an extended position and a retracted position, wherein each of the right straight-line linkage and the left straight-line linkage further comprises a first scissor unit and a second scissor unit each of which comprises of a first bar comprising a first end coupled to the tire mounting assembly and a second end and a second bar comprising a first end coupled to the frame mounting member and a second end, wherein the second end of the first bar and the second end of the second bar are pivotally coupled together.

16. The vehicle of claim 15, and further comprising:
a first timing linkage connected between the first bar of the first scissor unit and the first bar of the second scissor unit on the right straight-line linkage;
a second timing linkage connected between the second bar of the first scissor unit and the second bar of the second scissor unit on the right straight-line linkage; and
wherein the right straight-line linkage and the left straight-line linkage each move independently from each other between an extended position and a retracted position and the first timing linkage and the second timing linkage cooperate to maintain the right tire assembly parallel to the frame mounting member.

17. The vehicle of claim 16, wherein the first timing linkage further comprises of an arcuate member with a connection point at a center of an arc and a connection point at each outer end of the arc, wherein the arcuate member is combined to the right tire assembly at the connection point at the center of the arc, the arcuate member is combined to one of the first bars at one outer end of the arc, and the arcuate member is combined to the other first bar at the other outer end of the arc for maintaining an angel between each of the first bar of the first scissor unit and the first bar of the second scissor unit equal and opposite to each other with respect to a horizontal pivot axis, wherein the second timing linkage further comprises of an elongated member with a connection point at a center of the elongated member and a connection point at each outer end of the elongated member, wherein the elongated member is combined to the frame mounting member at the connection point at the center of the elongated member, the elongated member is combined to one of the second bars at one outer end of the elongated member, and the elongated member is combined to the other second bar at the other outer end of the elongated member for maintaining an angel between each of second bar of the second scissor unit and the second bar of the second scissor unit equal and opposite to each other with respect to the horizontal pivot axis.

18. The vehicle of claim 15, wherein the tire mounting assembly of the right straight-line linkage further comprises of an inner-knuckle assembly, an outer knuckle assembly, and a steering cylinder attached between the inner-knuckle assembly and the outer knuckle assembly, wherein a steering angle of the steering cylinder remains constant during the extension and retraction of the tire mounting assembly.

* * * * *

UNITED STATES PATENT AND TRADEMARK OFFICE
CERTIFICATE OF CORRECTION

PATENT NO. : 10,549,579 B1
APPLICATION NO. : 16/210104
DATED : February 4, 2020
INVENTOR(S) : Thomas C. Boe et al.

Page 1 of 1

It is certified that error appears in the above-identified patent and that said Letters Patent is hereby corrected as shown below:

In the Specification

Column 2, Line 25 - the word "angel" should be corrected to "angle"
Column 2, Line 34 - the word "angel" should be corrected to "angle"

In the Claims

Claim 12, Line 43 - the word "angel" should be corrected to "angle"
Claim 13, Line 56 - the word "angel" should be corrected to "angle"
Claim 17, Line 42 - the word "angel" should be corrected to "angle"
Claim 17, Line 55 - the word "angel" should be corrected to "angle"

Signed and Sealed this
Thirty-first Day of March, 2020

Andrei Iancu
*Director of the United States Patent and Trademark Office*